Dec. 12, 1933.　　　　J. HANGONYI　　　　1,939,550
MOUNTING FOR DIRIGIBLE HEADLIGHTS
Filed Jan. 12, 1933
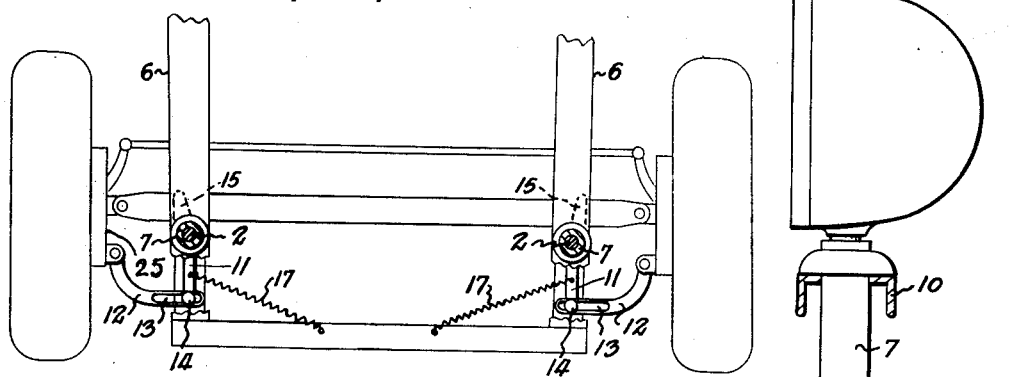
Inventor
John Hangonyi Patented Dec. 12, 1933

1,939,550

UNITED STATES PATENT OFFICE 1,939,550

MOUNTING FOR DIRIGIBLE HEADLIGHTS

John Hangonyi, Buffalo, N. Y.

Application January 12, 1933. Serial No. 651,387

1 Claim. (Cl. 240—62)

My invention relates to dirigible headlights for automobiles and the object of my invention is to provide a simple and positive turning mechanism which can be readily installed in the modern type of automobile, the only alteration to the automobile chassis frame being the provision of a pair of orifices in each channel-shaped side member of the frame, each pair of orifices receiving a spindle upon the upper end of which the headlight is mounted.

A further object of my invention is to furnish a mechanism in which the spindles can be readily secured in place and connected to the elements provided in conjunction therewith for obtaining rotative movement of the spindles, and a still further object of my invention is to so construct the spindle rotating elements that they are each capable of independent movement dependent upon the direction in which the automobile is turned.

My invention consists of a mounting for dirigible headlights for automobiles all as hereinafter more fully described and illustrated in the accompanying drawing in which:

Figure 1 is a front elevational view of an automobile fitted with my dirigible headlights.

Figure 2 is a plan view of the front end of the automobile chassis showing my mechanism applied thereto.

Figure 3 is an enlarged side elevational view of one of my headlights and the mounting therefor together with a fragmentary portion of the chassis frame, and Figure 4 is a longitudinal sectional view through an alternative form of flexible connection which may be used in my invention.

Like characters of reference indicate corresponding parts in the different views in the drawing.

My headlights 1 are mounted upon the upper ends of a pair of spindles 2 which each extends downwardly through a pair of upper and lower orifices 3 and 4 in the flanges 5 of the side members 6 of the chassis frame. The portions of the spindles extending upwardly from the frame are contained within housings 7 which are fitted with upper and lower ball races 8 and 9 in which the spindles are carried. The housings 7 are carried upon the upper faces of the flanges 5 and are rigidly retained at their upper ends by the use of a cross bar 10 extending between the front fenders.

The lower ends of the spindles 2 carry a pair of horizontal arms 11 which are rigidly secured to the spindles. The hub assemblies of the front wheels are each provided with a suitably connected substantially L-shaped arm 12 which protrude inwardly towards the chassis and are formed in the vicinity of their inner ends with slots 13 which receive pins 14 furnished upon the outer ends of the arms 11, the pins being freely slidable within the slots.

The headlights are retained in their normal forwardly directed position by stop members 15 which are carried upon the spindles 2 intermediately of their length between the frame flanges 5 and which are adapted to normally bear against the webs 16 of the channels. 17 are a pair of tension springs extending from the arms 11 to the front cross member or other suitable place on the chassis frame and against the tension of which the spindles are rotated.

In mounting the stop members 15 upon the spindles, I form the lower portions 18 of the spindles of square cross section of corresponding dimensions to square orifices 19 in the stop members and when positioning the spindles in place mount the stop members 15 upon their lower ends before the lower ends of the spindles are inserted through the lower orifices 4 in the side members of the chassis frame, springs 20 being interposed between the stop members and the lower faces of the upper flanges 5. In order to retain the stop members 15 in place intermediately of the distance between the flanges 5, I insert pins 21 through transverse orifices in the spindles and upon which the members 15 rest under a downward pressure of the springs 20.

The operation of my headlights is as follows:

When the driver turns the steering wheel so as to cause the automobile to turn, say to the left, the left hand headlight 1 will, through the medium of the lever 11 and arm 12 extending between the hub assembly and the spindle 2, be caused to turn to the left against the action of the spring 17, whereas the right hand headlight will remain stationary in its normal position as the stud 14 slides along the slot 13 as its arm 12 is moved. When the front wheels are again turned to the normal position the left hand headlight member will be returned to its normal position through the rotation of its spindle 2 under the tension of its spring 17, the stop piece 15 moving into position to bear against the web 16 of the chassis frame. When the car is turned to the right the right hand headlight will move in the same manner and the left hand headlight remain stationary.

Figure 4 shows a modified form of sliding connection which can be used in lieu of the arm 12 and comprises a cylinder 22 flexibly connected as by ring 23 to the forward end of the lever 11 together with a rod 24 flexibly connected to the hub assembly 25 and provided with a piston member 26 slidably contained within the cylinder 22, a cover plate 27 being secured to the open end of the cylinder and having an orifice 28 therein through which the rod 24 extends. When the hub assembly is swung in one direction the piston member 26 will engage the cover plate 27 and through the medium of the cylinder 22 and its connection swing the lever 11 and when the hub assembly is moved in the opposite direction the piston 26 will slide within the cylinder 22 and permit the lever 11 to remain stationary.

From the foregoing description it will be apparent that I have devised a simple type of mounting for headlights which is particularly applicable for modern automobile construction and having now shown and described my construction, what I claim as my invention is:

A mounting for dirigible headlights for automobiles comprising a rotatable vertical spindle extending through a pair of orifices in the upper and lower flanges in the channel side member of an automobile chassis frame and upon the upper end of which the headlight is mounted, a slotted arm having a to and fro movement in the direction of the length of its slot and connected at one end to the hub assembly of one front wheel of the car, a lever connected to the lower end of the headlight supporting spindle underneath the chassis frame, a pin on the other end of the lever protruding into the slot in the arm and normally positioned within one end of the slot whereby movement of the slotted member in one direction swings the arm to rotate the shaft and movement of the slotted arm in the other direction permits the arm to remain stationary as the pin on the lever slides along the slot, a stop member mounted intermediately of the length of the shaft and adapted to engage the web of the channel side member of the chassis frame to retain the shaft against rotative movement beyond a predetermined limit, and a tension spring extending between the lever and the chassis frame.

JOHN HANGONYI.